US012656569B2

(12) United States Patent
Yan

(10) Patent No.: US 12,656,569 B2
(45) Date of Patent: Jun. 16, 2026

(54) LENS, LENS MODULE, AND ELECTRONIC DEVICE

(71) Applicant: AAC OPTICS (CHANGZHOU) CO., LTD., Changzhou City (CN)

(72) Inventor: Junjie Yan, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 427 days.

(21) Appl. No.: 18/327,864

(22) Filed: Jun. 1, 2023

(65) Prior Publication Data

US 2024/0069302 A1 Feb. 29, 2024

Related U.S. Application Data

(63) Continuation of application No. PCT/CN2022/116183, filed on Aug. 31, 2022.

(51) Int. Cl.
*G02B 7/02* (2021.01)
(52) U.S. Cl.
CPC .............. *G02B 7/021* (2013.01); *G02B 7/02* (2013.01)
(58) Field of Classification Search
CPC .................................. G02B 7/021; G02B 7/02
USPC .................................................. 359/811–830
See application file for complete search history.

(56) References Cited

U.S. PATENT DOCUMENTS

2022/0163750 A1* 5/2022 Hu .......................... G02B 7/021

FOREIGN PATENT DOCUMENTS

CN      110320632 A  * 10/2019 ............. G02B 7/021
CN      211481354 U  *  9/2020
WO      WO-2019233276 A1 * 12/2019 ............... G02B 7/02

* cited by examiner

*Primary Examiner* — Mahidere S Sahle
(74) *Attorney, Agent, or Firm* — Wiersch Law Group

(57) ABSTRACT

A lens is provided. The lens includes a lens tube and a plurality of lens elements received in the lens tube. A respective lens element includes an imaging section for imaging and a mounting section for assembling and arranged outside the imaging section. The plurality of lens elements includes at least one dimming lens element disposed close to an imaging plane, and a respective dimming lens element includes at least one dimming section parallel to an optical axis, wherein a vertical distance between a respective one of the at least one dimming section and the optical axis is smaller than a radius of the imaging section. In addition, a lens module and an electronic device installed with the lens are provided, which can reduce the distance between a screen opening and a frame of the electronic device.

11 Claims, 8 Drawing Sheets

100

10

A–A

100'

LENS, LENS MODULE, AND ELECTRONIC DEVICE

TECHNICAL FIELD

The disclosure relates to the field of camera technology, and more particularly to a lens, a lens module, and electronic device.

BACKGROUND

In smart phones and other electronic devices, demands on full screens have been increasingly increased, and existing bangs screens, water drop screens, and digging screens are gradually unable to meet the market demand. Arrangement of a front lens in the screen is a main factor that affects development of the full screen due to the limitation of a lens size, especially a large size at a bottom of a lens module, and a large distance from an entrance pupil of the lens to a frame, and thus an opening of the lens needs to be arranged in the display region of the screen, which may occupy the area of the display region.

Therefore, it is necessary to provide a lens, a lens module, and an electronic device.

SUMMARY

Embodiments of the disclosure aim to provide a lens, a lens module, and an electronic device with a small distance from an entrance pupil to a frame.

In order to achieve the above object, a lens is provided. The lens includes a lens tube and a plurality of lens elements. The plurality of lens elements received in the lens tube, wherein a respective lens element includes an imaging section for imaging and a mounting section for assembling and arranged outside the imaging section. The plurality of lens elements includes at least one dimming lens element disposed close to an imaging plane, and a respective dimming lens element includes at least one dimming section parallel to an optical axis, wherein a vertical distance between a respective one of the at least one dimming section and the optical axis is smaller than a radius of the imaging section. The lens tube includes a sky surface far away from the imaging surface and a side wall bent and extended from the sky surface, the side wall includes a planar wall parallel to the dimming section, and the at least one dimming section is arranged corresponding to the planar wall.

In some embodiments, the plurality of lens elements further include at least one trimming lens element, and the at least one trimming lens element is disposed on an object side of the at least one dimming lens element. A respective trimming lens element includes at least one assembly section parallel to the optical axis, and a vertical distance between a respective one of the assembly section and the optical axis is smaller than a radius of the mounting section and larger than the radius of the imaging section. The at least one assembly section is parallel to at least one dimming section or the at least one assembly section is coplanar with at least one dimming section.

In some embodiments, the planar wall is extended to the sky surface.

In some embodiments, the respective dimming lens element includes two dimming sections that are perpendicular to each other, and the lens tube includes two planar walls.

In some embodiments, the respective dimming lens element includes two dimming sections that are perpendicular to each other, the respective trimming lens element includes two assembly sections, and the lens tube includes two planar walls, wherein the two assembly sections and the two dimming sections are in one-to-one correspondence.

In some embodiments, each of the two planar walls is extended to the sky surface.

In some embodiments, a vertical distance between one of the two dimming sections and the optical axis is equal to a vertical distance between the other of the two dimming sections and the optical axis.

In some embodiments, a lens module is provided. The lens module includes the lens described in any aspect above, a housing for receiving the lens, and a sensor and a circuit board fixed to the housing, wherein the lens includes a lens tube, and the lens tube includes a sky surface far away from an imaging surface and a side wall bent and extended from the sky surface. The side wall includes at least one planar wall. The housing includes a top surface parallel to the sky surface and a side surface bent and extended from the top surface, wherein the top surface is rectangular and has an opening, the opening is defined by an opening arc edge and at least one opening straight edge, and a diameter of an entrance pupil of the lens is located inside the opening, where the at least one opening straight edge is parallel to the planar wall, and the side surface includes first side surfaces parallel to the at least one opening straight edge and second side surfaces each connected between first side surfaces. An imaging range of the lens is defined by an imaging arc edge and at least one imaging straight edge, the sensor is arranged within the imaging range, and the sensor is rectangular, and a diameter of a head of the lens is smaller than a length of a short edge of the sensor.

In some embodiments, the opening has two opening straight edges that are perpendicular to each other, the side wall includes two planar walls that are perpendicular to each other, and the imaging range of the lens is defined by two imaging straight edges that are perpendicular to each other.

In some embodiments, the two opening straight edges have an equal length.

In some embodiments, an electronic device is provided. The electronic device includes a screen and the lens module described in any aspect above. The screen includes a display region and a non-display region disposed outside the display region, and further includes a lens opening corresponding to the lens module, wherein the lens opening is at least partially located in the non-display region.

In some embodiments, the lens opening is located on one side of the screen.

In some embodiments, the lens opening is located at one corner of the screen.

In some embodiments, the lens opening is located in the non-display region.

BRIEF DESCRIPTION OF THE DRAWINGS

In order to more clearly explain that embodiments of the disclosure, the drawings required for use in the embodiments will be briefly described below, and it will be apparent that the drawings described below are only some of the embodiments of the disclosure, from which other drawings may be obtained without creative effort by a person of ordinary skill in the art.

DETAILED DESCRIPTION OF THE EMBODIMENTS

Figure 1:
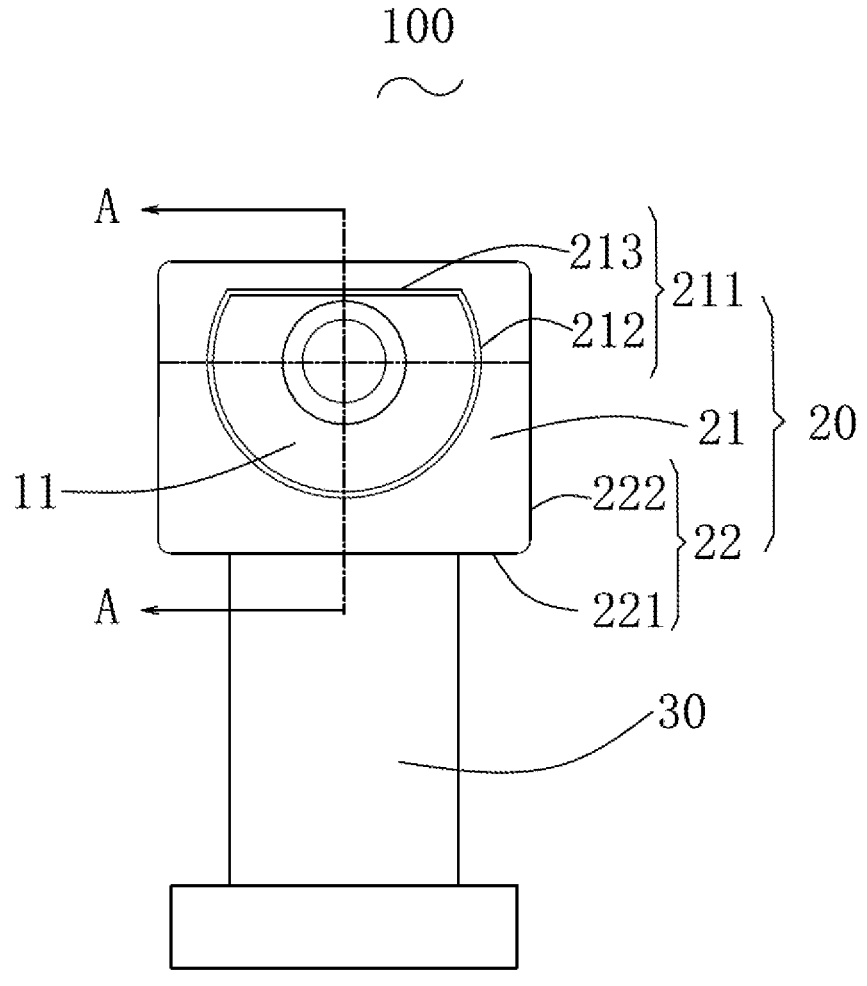
FIG. 1 is a schematic structural view of a lens module according to an embodiment of the disclosure.
Figure 2:
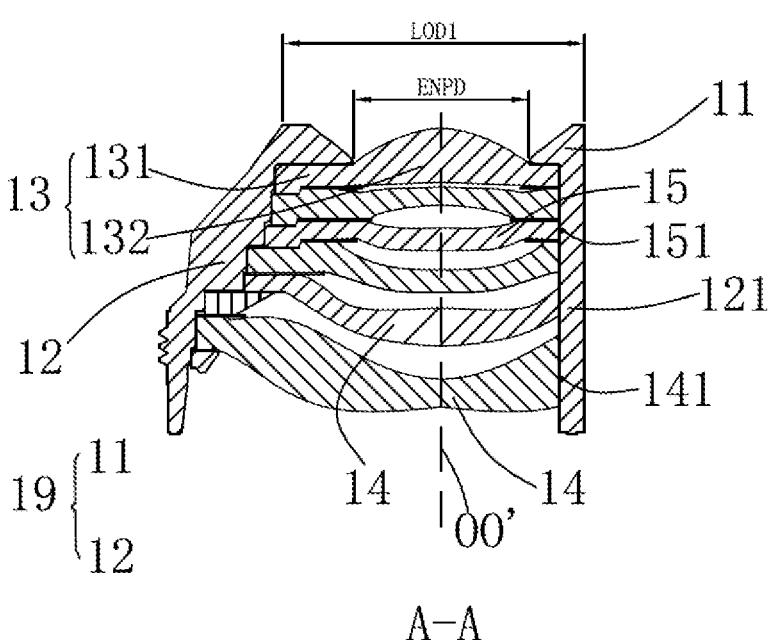
FIG. 2 is a cross-sectional view of the lens along A-A according to an embodiment of the disclosure.
Figure 3:
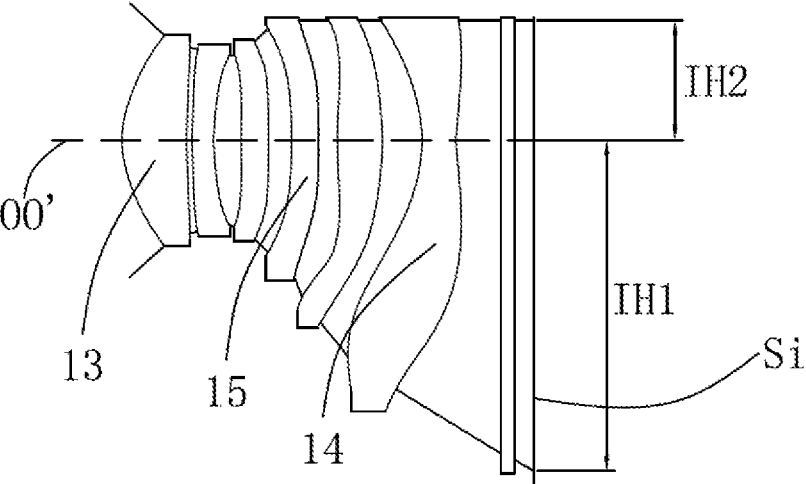
FIG. 3 is an optical path diagram of the lens in FIG. 2 according to an embodiment of the disclosure.
Figure 4:
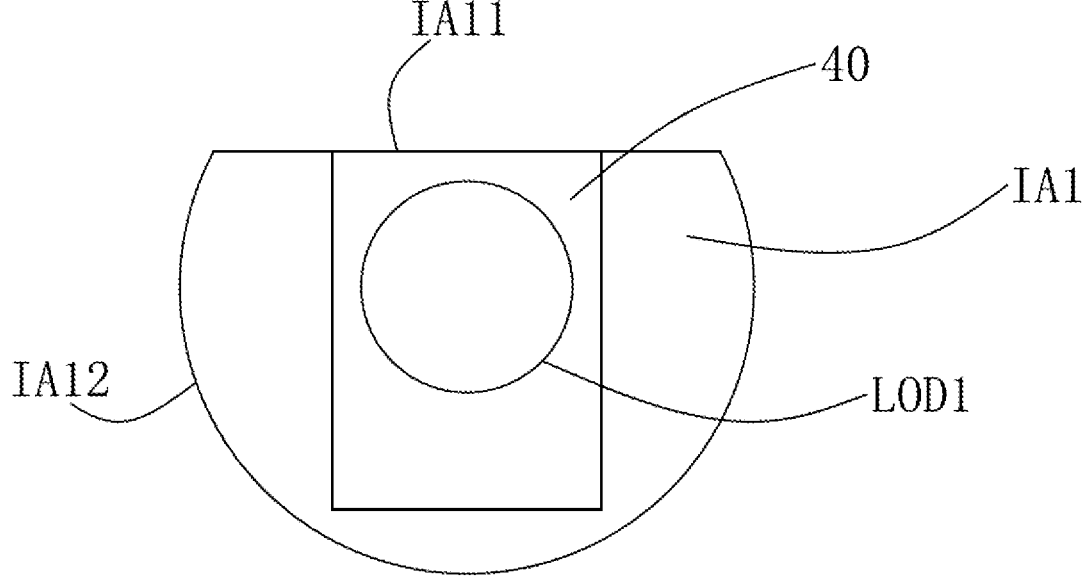
FIG. 4 is a contrast diagram of an imaging range, and arrangement of a sensor and a lens head of the lens module according to an embodiment of the disclosure.
Figure 5:
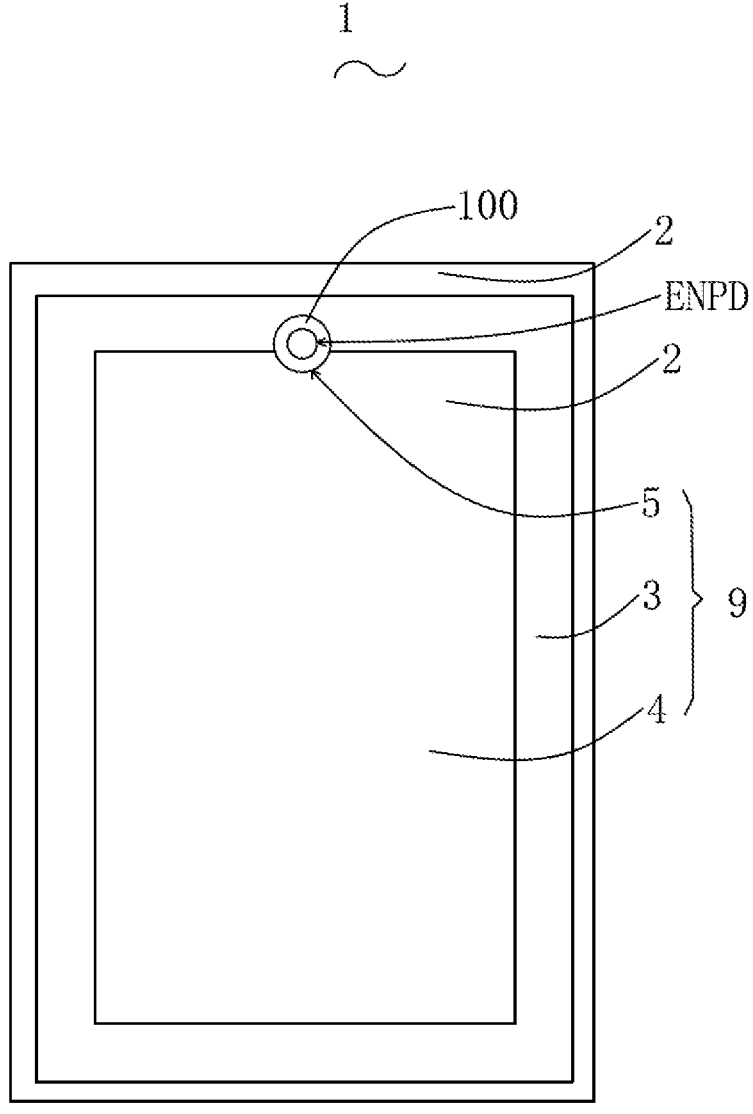
FIG. 5 is a schematic diagram of an electronic device according to an embodiment of the disclosure.

In order to enable the object, technical solutions, and advantages of the embodiments of the disclosure clearer, embodiments of the disclosure may be described in detail below with reference to accompanying drawings. However, one of ordinary skill in the art may appreciate that in various embodiments of the disclosure, numerous technical details have been provided to better understand the application for the reader. It can be understood that even without these technical details and variations and modifications based on the following embodiments, the technical solutions herein may be realized.

Referring to FIGS. 1 to 5, embodiments of the present disclosure provide a lens module 100. The lens module 100 includes a lens 10, a housing 20 for accommodating the lens 10, a sensor 40 fixed to the housing 20, and a circuit board 30 fixed to the housing 20. The lens 10 includes a lens tube 19 and a plurality of lens elements 13 accommodated in the lens tube 19. A respective lens element 13 includes an imaging section 132 for imaging and a mounting section 131 for assembling of the respective lens element 13 and arranged outside the imaging section 132. The plurality of lens elements 13 includes two dimming lens elements 14 disposed close to an imaging plane Si. Each dimming lens element 14 includes at least one dimming section 141 parallel to an optical axis OO', and a vertical distance between the dimming section 141 and the optical axis OO' is smaller than a radius of the imaging section 132. The lens tube 19 includes a sky surface 11 far away from the imaging plane Si and a side wall 12 bent and extended from the sky surface 11. The side wall 12 includes a planar wall 121 parallel to the dimming section 141. The dimming section 141 is arranged corresponding to the planar wall 121. Compared with the existed technologies, a projection area of the lens module 100 along the optical axis OO' direction is reduced by arranging the dimming section 141 and the planar wall 121, that is, the bottom size of the lens module 100 is reduced, the lens module 100 can be arranged closer to a frame of an electronic device 1. In other words, an entrance pupil can be at least partially arranged in a non-display region 3 of a screen, and an occupied area of an opening 5 of the lens in the display region 4 is reduced. That is, since the opening 5 of the lens needs to be arranged corresponding to the entrance pupil of the lens, i.e., the entrance pupil of the lens determines a position of the opening of the lens on the screen. Since the bottom size of the lens module is reduced on one side, the entrance pupil is closer to the frame, the opening 5 of the lens is also closer to the frame, which is beneficial to realizing the overall screen design of the electronic device. In other embodiments, the number of dimming lens elements can be increased or decreased as needed, and the lens 10 includes at least one dimming lens element. If the lens 10 only includes one dimming lens element, the dimming lens element is best disposed on a side closest to the imaging surface has the best effect.

In the embodiments of the disclosure, the lens module 100 may have different imaging heights and imaging ranges in different directions. A dimmed imaging height IH2 on a side close to the dimming section 141 is smaller than a normal imaging height IH1 on a side away from the dimming section 141. An imaging range (or imaging region) IA1 of the lens 10 is defined by an imaging arc edge IA12 and an imaging straight edge IA11. The sensor 40 is completely arranged within the imaging range IA1 of the lens 10. The sensor 40 is rectangular, and a ratio of a long edge to a short edge of the sensor 40 may be 4:3 or 16:9, etc. The imaging straight edge IA11 may be separated from the short edge of the sensor so that a certain assembly offset does not affect the imaging of the sensor. A shape of an image formed by the sensor is the same as that of the sensor. A diameter LOD1 of the head of the lens 10 is smaller than a length of the short edge of the sensor.

In embodiments of the disclosure, the housing 20 has a top surface 21 parallel to the sky surface 11 and a side surface 22 bent and extended from the top surface 21. The top surface 21 is rectangular and has an opening 211. The opening 211 is defined by an opening arc edge 212 and an opening straight edge 213. A diameter ENPD of the entrance pupil of the lens 10 is located inside the opening 211. The opening straight edge 213 is parallel to the planar wall 121. The side surface 22 includes two first side surfaces 221 parallel to the opening straight edge 213 and two second side surfaces 222 each connected between the two first side surfaces 221.

The electronic device 1 includes a screen 9, the lens module 100, and a frame 2. The screen 9 includes a display region 4 and a non-display region 3 arranged outside the display region 4. The screen 9 further includes a lens opening 5 corresponding to the lens module 100. The lens opening 5 is located at one side of the screen 9, and the lens opening 5 is at least partially located in the non-display region 3, to reduce a screen opening area in the display region 4. In other alternative embodiments, the lens opening may be located entirely in the non-display region, thereby achieving a full screen of the electronic device.

In embodiments of the disclosure, the plurality of lens elements 13 further include four trimming lens elements 15. The trimming lens elements 15 are arranged on an object side of the dimming lens elements 14. The trimming lens elements 15 includes an assembly section 151 parallel to the optical axis OO'. A vertical distance from the assembly section 151 to the optical axis OO' is smaller than a radius of the mounting section 131 and larger than the radius of the imaging section 132. That is, in the plurality of lens elements 13, two lens elements arranged near an imaging side are dimming lenses and remaining lens elements are trimming lens elements, so that the optical performance of the lens is reasonably retained while reducing the volume. The assembly section 151 is parallel to the dimming section 141, or the assembly section 151 is coplanar with the dimming section 141, and the two types of sections are on a same side and at a same angle of the lens, which can minimize the overall volume of the lens. In other embodiments, the number of dimming lens elements can be adjusted according to different lens sizes and different volume or optical performance requirements of the lens design, and there may be at least one dimming lens element. Similarly, the number of trimming lens elements can be adjusted, and even no trimming lens element can be provided. In order to meet special optical requirements, for example, to eliminate stray light, the dimming section and the assembly section can be non-coplanar or non-parallel, and are cross-arranged at an angle in a plane perpendicular to the optical axis, and different structural designs are used to eliminate stray light.

In embodiments of the disclosure, there is only one planar wall 121, and the planar wall 121 is extended to the sky surface 11. That is, one planar wall 121 is directly connected with the sky surface. With this design, it is possible to reduce volume as much as possible, and reduce the production difficulty of many processes and improve the production yield. For example, the planar wall extending to the sky surface makes it easier to take and place. In other embodiments, the planar wall may include two walls which respectively correspond to the dimming section or the assembly section, or the planar wall may be stepped to correspond to the stepped edges of the lens element, according to the number of dimming lens elements and trimming lens elements. For example, when the first of the plurality of lenses from the object side is neither a dimming lens element nor a trimming lens element, an outer surface of the lens tube corresponding to the first of the plurality of lenses is a whole circle of cylindrical shape. When the second of the plurality of lenses from the object side is a trimming lens element or a dimming lens element, and an outer surface of the lens tube corresponding to the second of the plurality of lenses is a planar wall. In this case, the planar wall is separated from the sky surface by a section of cylindrical wall.

Figure 6:
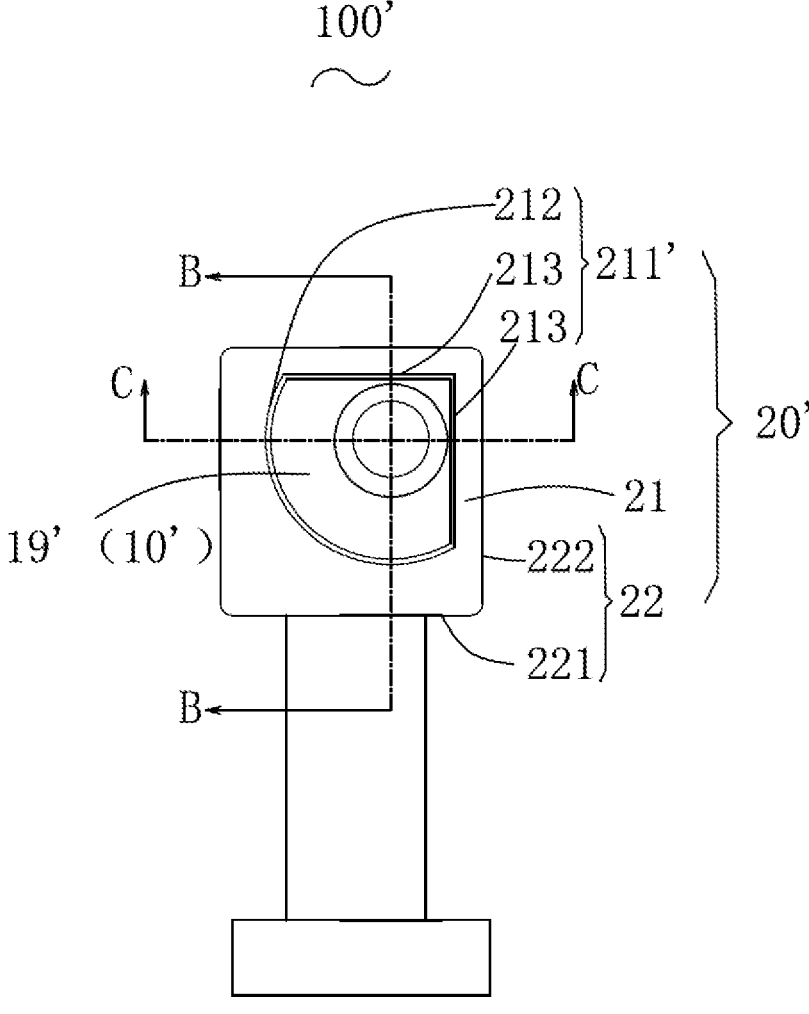
FIG. 6 is a schematic structural view of a lens module according to another embodiment of the disclosure.
Figure 7:
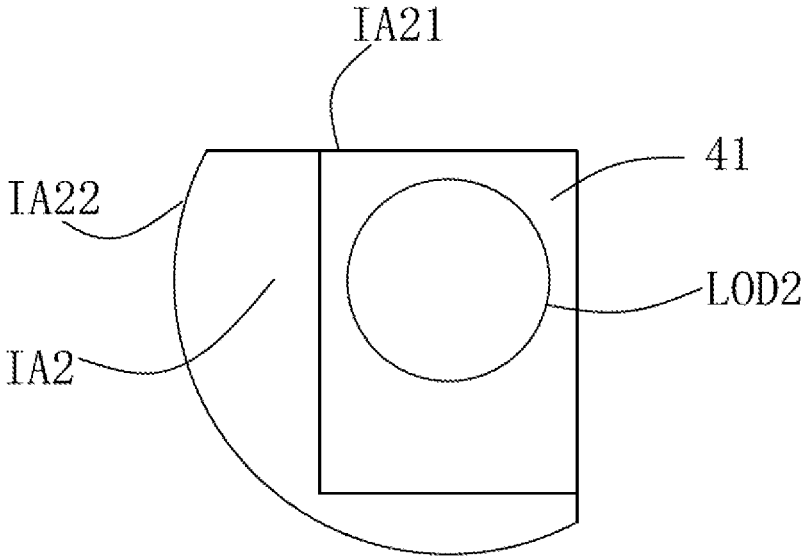
FIG. 7 is a contrast diagram of an imaging range, and arrangement of a sensor and a head of a lens of the lens module according to an embodiment of the disclosure.
Figure 8:
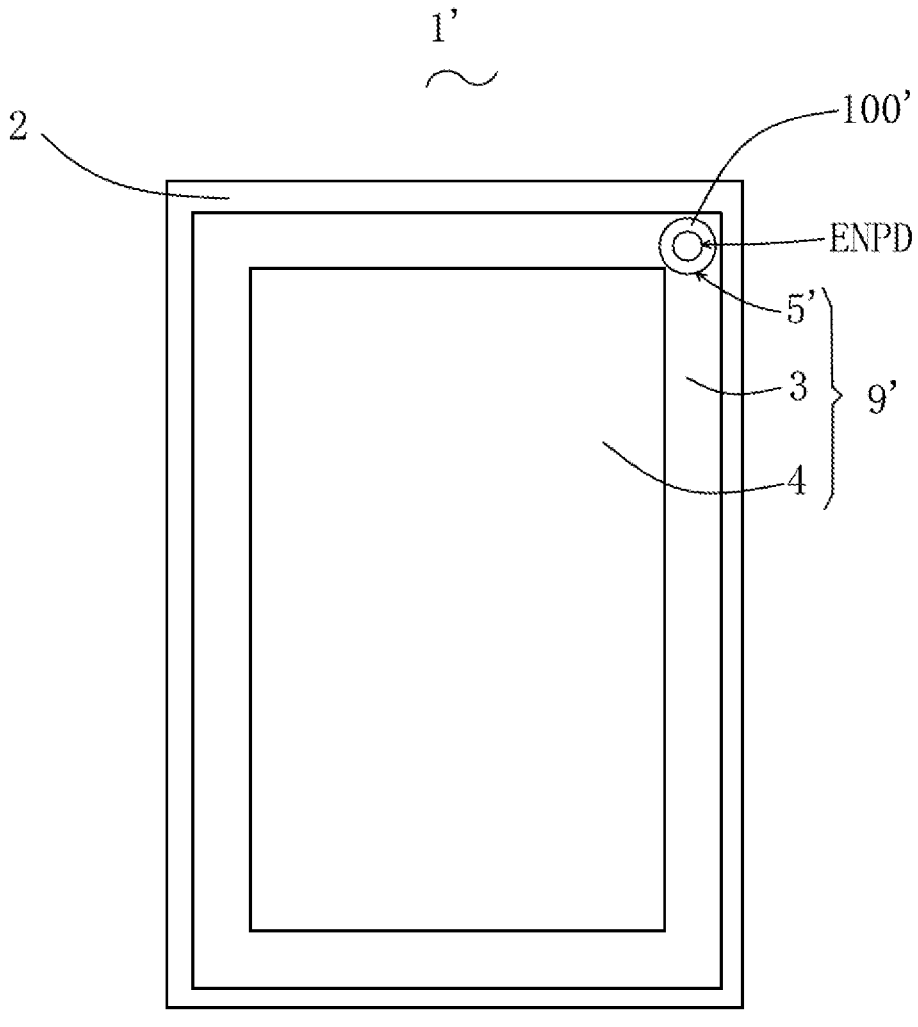
FIG. 8 is a schematic diagram of an electronic device according to another embodiment of the disclosure.

FIGS. 6 to 8 illustrate another embodiment of the present disclosure. The following merely describe differences from the above embodiments briefly. In the present embodiment of the disclosure, a cross-sectional view of a lens 10' of the lens module 100' along direction B-B and a cross-sectional view of the lens 10' along direction C-C are similar to those of FIG. 2, so that no repetitive drawing is made and can be understood in conjunction with FIG. 2.

In embodiments of the disclosure, each dimming lens element 14 includes two dimming sections 141 that are perpendicular to each other, the trimming lens element 15 includes two assembly sections 151, and the lens tube 19' includes two planar walls 121. The two assembly sections 151 and the two dimming sections 141 are in one-to-one correspondence.

An opening 211' of the housing 20' has two opening straight edges 213 that are perpendicular to each other. The side wall 12 includes two planar walls 121 that are perpendicular to each other. An imaging range (i.e., imaging region) IA2 of the lens is defined by two imaging straight edges IA21 that are perpendicular to each other and an imaging arc edge IA22. The sensor 41 is completely arranged within the imaging range IA2 of the lens 10. The sensor 41 is rectangular, a ratio of a long edge to a short edge of the sensor can be 4:3 or 16:9, etc. The imaging straight edge IA21 may be separated from the short edge of the sensor by a spacing so that a certain assembly offset does not affect the imaging of the sensor. A shape of an image formed by the sensor is the same as that of the sensor, and a diameter LOD2 of a head of the lens 10 is smaller than a length of a short edge of the sensor 41.

In embodiments of the disclosure, the two opening straight edges 213 have an equal length. Both planar walls extend to the sky surface. A vertical distance between one of the two dimming sections 141 and the optical axis OO' is equal to a vertical distance between the other of the two dimming sections 141 and the optical axis OO'. A vertical distance between one of the assembling sections 151 and the optical axis OO' is equal to a vertical distance between the other of the assembling sections 151 and the optical axis OO'. Therefore, the shape is regular and the optical performance is easy to evaluate. In other embodiments, the two opening straight edges may also have different lengths, A vertical distance between one of the two dimming sections 141 and the optical axis OO' is not equal to a vertical distance between the other of the two dimming sections 141 and the optical axis OO'. A vertical distance between one of the assembling sections 151 and the optical axis OO' is not equal to a vertical distance between the other of the assembling sections 151 and the optical axis OO'.

In the embodiments of the disclosure, the bottom size of the lens module 100' is reduced in both directions, the entrance pupil moves diagonally to the frame, the lens opening 5' of the electronic device 1' is located at one corner of the screen 9', and the deviation of the entrance pupil of the lens in the diagonal direction caused by the reduction of the bottom size of the lens module is fully utilized, and the lens opening 5' is all located in the non-display region 3, which may avoid defining a screen opening in the display region 4. In other optional embodiments, the lens opening can be partially located in the non-display region, and only one fan-shaped opening needs to be defined in the display region.

The foregoing embodiments are merely some embodiments of the disclosure and are not intended to limit the present disclosure. Any modifications, equivalents, modifications, or the like made within the spirit and principles of the present disclosure should be included within the scope of protection of the present disclosure.

What is claimed is:

1. A lens, comprising:
a lens tube; and
a plurality of lens elements received in the lens tube, wherein a respective lens element includes an imaging section for imaging and a mounting section for assembling and arranged outside the imaging section, wherein
the plurality of lens elements includes at least one dimming lens element disposed close to an imaging plane, and a respective dimming lens element includes at least one dimming section parallel to an optical axis, wherein a vertical distance between a respective one of the at least one dimming section and the optical axis is smaller than a radius of the imaging section;
the lens tube includes a sky surface far away from the imaging surface and a side wall bent and extended from the sky surface, the side wall includes a planar wall parallel to the dimming section, and the at least one dimming section is arranged corresponding to the planar wall;
the respective dimming lens element includes only two dimming sections that are perpendicular to each other, and the lens tube includes two planar walls, the lens tube includes only two planar walls, each of the two planar walls is extended to the sky surface; and
the plurality of lens elements further include at least one trimming lens element, and the at least one trimming lens element is disposed on an object side of the at least one dimming lens element, a respective trimming lens element includes only two assembly sections parallel to the optical axis, and a vertical distance between a respective one of the assembly section and the optical axis is smaller than a radius of the mounting section and larger than the radius of the imaging section; and each of the only two assembly sections is parallel to one of the only two dimming sections or each of the only two assembly sections is coplanar with one of the only two dimming sections, the only two assembly sections and the only two dimming sections are in one-to-one correspondence.

2. The lens of claim 1, wherein a vertical distance between one of the only two dimming sections and the optical axis is equal to a vertical distance between the other of the only two dimming sections and the optical axis.

3. A lens module, comprising:

the lens of claim 1;

a housing for receiving the lens; and a sensor and a circuit board fixed to the housing, wherein the lens includes the lens tube, and the lens tube includes the sky surface far away from the imaging surface and the side wall bent and extended from the sky surface, wherein the side wall includes at least one planar wall; and the housing includes a top surface parallel to the sky surface and a side surface bent and extended from the top surface, wherein the top surface is rectangular and has an opening, the opening is defined by an opening arc edge and only two opening straight edges, and a diameter of an entrance pupil of the lens is located inside the opening, wherein the at least one opening straight edge is parallel to the planar wall, and the side surface includes first side surfaces parallel to the at least one opening straight edge and second side surfaces each connected between first side surfaces; and an imaging range of the lens is defined by an imaging arc edge and at least one imaging straight edge, the sensor is arranged within the imaging range, and the sensor is rectangular, and a diameter of a head of the lens is smaller than a length of a short edge of the sensor.

4. The lens module of claim 3, wherein the opening has two opening straight edges that are perpendicular to each other, the side wall includes two planar walls that are perpendicular to each other, and the imaging range of the lens is defined by two imaging straight edges that are perpendicular to each other.

5. The lens module of claim 4, wherein the two opening straight edges have an equal length.

6. The lens module of claim 3, wherein a vertical distance between one of the only two dimming sections and the optical axis is equal to a vertical distance between the other of the only two dimming sections and the optical axis.

7. An electronic device, comprising:

a screen; and the lens module of claim 3, wherein the screen includes a display region and a non-display region disposed outside the display region, and further includes a lens opening corresponding to the lens module, wherein the lens opening is at least partially located in the non-display region.

8. The electronic device of claim 7, wherein the lens opening is located at one corner of the screen.

9. The electronic device of claim 7, wherein the opening has only two opening straight edges that are perpendicular to each other, the side wall includes two planar walls that are perpendicular to each other, and the imaging range of the lens is defined by two imaging straight edges that are perpendicular to each other.

10. The electronic device of claim 9, the two opening straight edges have an equal length.

11. The electronic device of claim 8, wherein the lens opening is located in the non-display region.

* * * * *